United States Patent [19]

Turk et al.

[11] Patent Number: 5,618,467

[45] Date of Patent: *Apr. 8, 1997

[54] LUMINESCENT MATERIALS, PHOSPHORS AND COMPOSITIONS CONTAINING SUCH PHOSPHORS

[75] Inventors: Richard S. Turk, East Lansing; Joel I. Dulebohn, Lansing, both of Mich.

[73] Assignee: Michigan Biotechnology Institute, Lansing, Mich.

[*] Notice: The term of this patent shall not extend beyond the expiration date of Pat. No. 5,464,651.

[21] Appl. No.: 548,647

[22] Filed: Oct. 26, 1995

Related U.S. Application Data

[63] Continuation-in-part of Ser. No. 154,230, Nov. 18, 1993, Pat. No. 5,464,651.

[51] Int. Cl.$^6$ .............................. B05D 5/06; C09K 11/06
[52] U.S. Cl. ............................ 252/301.16; 252/301.35; 501/32
[58] Field of Search ..................... 252/301.16, 301.35; 501/32

[56] References Cited

U.S. PATENT DOCUMENTS

| | | | |
|---|---|---|---|
| 3,015,567 | 1/1962 | Hause | 99/143 |
| 3,993,795 | 11/1976 | Mauron | 426/618 |
| 3,998,943 | 12/1976 | Ullman | 424/12 |
| 4,064,138 | 12/1977 | Saari et al. | 548/344 |
| 4,399,090 | 8/1983 | Sprangers et al. | 264/63 |
| 4,780,376 | 10/1988 | Nakamura | 428/691 |
| 5,003,182 | 3/1991 | Umemoto et al. | 250/484.1 |
| 5,229,161 | 7/1993 | Turk | 426/649 |
| 5,464,651 | 11/1995 | Turk et al. | 427/385.5 |

OTHER PUBLICATIONS

Bredol, Michael, et al., "Designing Luminescent Materials," Adv. Mater. 3 (1991) No. 7/8, pp. 361–367.

*Primary Examiner*—Melissa Bonner
*Attorney, Agent, or Firm*—Quarles & Brady

[57] ABSTRACT

The present invention relates to luminescent materials, phosphors, and compositions containing phosphors and methods of their use. More particularly, it relates to organic phosphors which are amino acid salts and methods of using those phosphors and compositions to make objects photo-luminescent.

8 Claims, No Drawings

LUMINESCENT MATERIALS, PHOSPHORS AND COMPOSITIONS CONTAINING SUCH PHOSPHORS

RELATED CASE

The present application is a continuation-in-part of U.S. patent application Ser. No. 154,230 filed Nov. 18, 1993, now U.S. Pat. No. 5,464,651.

FIELD OF THE INVENTION

The present invention relates to phosphors, and luminescent compositions prepared from those phosphors. More particularly, it relates to organic phosphors which are glasses of amino acid salts, compositions containing the phosphors, luminescent materials and methods of preparing those phosphors and compositions to make photo-luminescent materials.

BACKGROUND OF THE INVENTION

Photo-luminescence is a spectral property of materials and is defined as the emission of light on exposure to invisible radiation or light of a different wavelength. Light energy which is absorbed by a crystal is normally lost in the internal vibrations of the crystal lattice. Luminescent materials which store the light energy and then reemit light at a lower energy are called phosphors. Most phosphors are excited with high energy photons in the UV region of the electromagnetic spectrum or by electrons from X-ray sources. The distinction between a fluorescent and phosphorescent material or phosphor is based on the time scale of the emission process. Materials which emit light on the scale of less than 1 microsecond are termed fluorescent. Phosphors emit light after the excitation source is turned off. This light may continue from tens of microseconds to several minutes.

Phosphors are used in a variety of applications, such as fluorescent lights, cathode ray and television screens, computer display devices, x-ray intensifying screens, brighteners in textiles and paper, and in phosphorescent analysis equipment.

Most phosphors are inorganic solids prepared from a metal cation, a nonmetal anion and an activator. The activator is usually a transition or a rare earth element which when added in small amounts (0.1% to 5%) can alter the color of the emitted light. For example, zinc sulfide (ZnS) can be activated with copper to give a blue-green emitting phosphor with a short lifetime of 35 microseconds. If copper is replaced with silver in the zinc sulfide lattice the emitted color is shifted to blue with a similar lifetime. Addition of the element cadmium (Cd) to ZnS:Ag increases the wavelength to green and extends the lifetime to 200 microseconds. The inorganic phosphor $ZnCdS_2$:Ag can actually be tuned in color by varying the Cd level from blue (no Cd) to red (high Cd).

Amorphous substances, formed either from cooling viscous melts or from liquids after transition from sol to gel, provide a rigid molecular environment necessary to induce phosphorescence and luminescence in the solid state. Oxide glasses, generally the silicates, are familiar amorphous solids that can be fabricated into optically transparent materials. The most common sol-gel glasses are those prepared from the hydrolysis and polymerization of metal alkoxides. The typical composition of sol-gel glasses comprises metal oxides from group IV elements (Ti, Si, Ge). Recently room temperature phosphorescence from trapped organic molecules in a porous silica matrix prepared by sol-gel polymerization has been observed.

The phenomena of room temperature phosphorescence has been observed from several aromatic organic molecules absorbed or trapped in solid matrices. Various organic materials have been used to enhance molecular luminescence in the solid state. The luminescence of rare earth metals and trace organic compounds occurs for molecules trapped in organic cryptands, β-cyclodextrin, and polymeric matrices. Organic acids and organic acid polymeric materials, such as sodium acetate and polyacrylic acid, are used to promote long lifetime room temperature phosphorescence from aromatic organic anions only if they are properly absorbed on surfaces.

The use of group I and group II metals to form complexes with naturally occurring amino acids and organic acids for the creation of photoluminescence has not been previously reported. Room temperature phosphorescence of biochemically important molecules absorbed on solid matrices has been enhanced in materials containing toxic heavy cations and anions. For example, aromatic amino acids (tyrosine and tryptophan) and derivatives show enhanced luminescence when absorbed on cellulose impregnated with sodium iodide.

Unfortunately, most of the phosphors currently in use are toxic and cannot be used in many applications. A need exists for phosphors and phosphor containing compositions that are non-toxic or which do not have the other disadvantages of the phosphors that are currently available for use.

BRIEF SUMMARY OF THE INVENTION

It is an object of the present invention to disclose organic phosphors and luminescent compositions prepared from such phosphors.

It also is an object to disclose methods of preparing those compounds and compositions to make them phosphorescent.

We have now discovered that certain amino acid and dicarboxylic acid salts and mixtures are phosphors which display an unexpected photo-luminescence when viewed under ultraviolet (UV) and fluorescent lights. I have discovered that several new formulations of the phosphor prepared from an amino acid, carboxylic or dicarboxylic acid and alkali metal salt produce an amorphous glass which is transparent under incandescent and fluorescent lighting. Some forms of the glass are phosphorescent and luminescent whereas other compositions show no luminescent properties. Several modifications are discussed which result in unexpected luminescent properties when a fluorescent or phosphorescent material is also added to the glass matrix. The new property of the organic glass may have important applications in the optical and optical electronics industries. Below gives a general description of the invention.

The amino acid salts may be represented by the following formula:

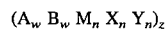

$(A_w\ B_w\ M_n\ X_n\ Y_n)_z$ in which A is an amino acid, selected from the class consisting of lysine, ornithine, and diaminopimelic acid, and a group of amino acids with the structure: $NH_2(CH_2)_nCOOH$ in which n is 1 to 6 (such as n=1: glycine; n=2: β alanine; n=3: γ amino butyric acid; n=4: aminovaleric acid; and n=5: 6 aminocaproic acid); B is a carboxylic acid selected from the class consisting of carbonic acid, oxalic acid, and a saturated linear di- or tricarboxylic acid of the structure:

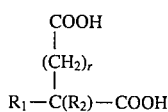

in which r is 0 to 10; $R_1$ is H, OH or $NH_2$; $R_2$ is H, OH, $CH_2COOH$, or $CH(OH)COOH$; w is 1 or 2; n is 0, 1 or 2 and the various n's may be the same or different; M is hydrogen or a metal selected from the Periodic Group IA, such as Li, Na or K, or a metal selected from the Periodic Group IIA, including Mg, Ca, Sr, or Ba, or a metal from Periodic Group IIB, including Zn, and when there are two M's they can be the same or different; X is a halogen, such as chlorine (Cl) or fluorine (F) or iodine (I); Y is hydroxyl (OH) and Y>X; and z is 1 to 16 formula units.

When r is not zero then B is a saturated linear dicarboxylic acid, such as succinic, glutaric, adipic, pimelic, malic, glutamic or aspartic acid. When r is zero the B may be a saturated linear dicarboxylic acid, such as malonic acid or a saturated linear tricarboxylic acid, such as citric or isocitric acid.

This convention for ionic compounds indicates that the compound can be made in a manner consistent with the molar ratio of its component ingredients. The number of formula units is typically between 1 and 16 and represents the addition of 1 to 32 molecules of amino acid. Each of the formula units consists of an amino acid and a dicarboxylic acid in the molar ratio of 1 to 1 or 2 to 1 or 1 to 2.

One of the glass materials, lysine succinate, emits a blue light with a lifetime of 3–5 seconds. Emission occurs after excitation with short-wave ultraviolet (SWUV) of about 230 nm to about 340 nm or long-wave ultraviolet (LWUV) light of about 340 nm to about 405 nm, and preferably about 366 nm. An "activation" process has been found for the amino acid phosphors in which the intensity of the phosphorescence is increased and the wavelength of the emitted light can be tuned from blue to green. The phosphorescence spectra of (L-lysine)(succinic acid)$Mg(OH)_2$ emits at a maximum of 484 nm (blue-green) and (L-lysine)(succinic acid)$(Zn(OH)_2)$ emits at 497 nm (green). Both phosphors have a lifetime of 10–15 seconds. Significant emission is visualized under excitation with SWUV, LWUV, fluorescent and incandescent lighting. The high intensity of sample (L-lysine)(succinic acid)$Mg(OH)_2$ is due to the presence of Mg in the lysine succinate salt. The emission is shifted to higher wavelengths in (L-lysine)(succinic acid)$(Zn(OH)_2)$ by substituting zinc for magnesium.

Some of the amino acid salts that possess photoluminescence are described in U.S. Pat. No. 5,229,161, "Metal Free and Low Metal Salt Substitutes Containing Lysine", "Metal Free and Low Metal Salt Substitutes Containing Lysine" and the publication in Chemistry of Materials, 1995, 7, 385, "Room-Temperature Phosphorescence of Amorphous Metal Complexes of Aliphatic Carboxylic Acids with Basic Amino Acids". Both the organic components of the salt substitutes, lysine and succinic acid, are also the components for the preferred organic salt phosphors.

The presently preferred amino acid glass former is the salt, lysine succinate, which contains L-lysine and succinic acid in the molar ratio of 1:1. However, dilysine succinate (ratio 2:1) and lysine (disuccinate) (ratio 1:2) are also useful.

A salt can be prepared with a minimum of 1 metal atom per 32 amino acid molecules when z is 16. A salt can be prepared with a maximum of 32 metal atoms per 32 amino acid molecules when z is 16.

The basic amino acid, such as lysine, can be used in its monohydrate form or preferably as a mixture of the monohydrate and the monohydrochloride (3:1 ratio). The amino acid can be used as either its L or D isomer without altering the properties of the phosphor. Other amino acids which are glass formers are linear amino acids with a carboxylic acid on one end and an amino group on the other end, such as glycine and amino butyric acid.

The dicarboxylic acids, such as succinic acid, can be used in their acid form or as a metal salt. The metal ions (M) of the salts can be selected from Periodic Groups IA, IIA including Mg, Ca, Sr, Ba, or IIB including Zn. These metals can be added as the metal oxide, such as CaO, MgO, ZnO, as the metal carbonate, $CaCO_3$, $MgCO_3$, or as the metal dicarboxylic acid, such as calcium succinate, magnesium succinate, or zinc succinate. The ions of IIA and IIB metals can be added together and used to tune the emitted wavelength.

The inorganic anions will normally be hydroxide ions (OH). Halide ions, $Cl^-$, $I^-$ or $F^-$ (X) can be included in the composition. A minimum of one halide ion can be added to the formula per 32 amino acid molecules when z is 16. The molar concentration of hydroxide ions (Y) is preferably greater than or equal to the molar concentration of halide ions (X).

It has also been determined that during the drying of the salts, various states of hydration may occur. The ingredients lysine monohydrochloride, lysine monohydrate, and sodium succinate all exist as hydrates. It has been found that the number of waters of hydration present depends on the number of chlorine atoms, sodium ions and succinic acid molecules in the formula unit. There may be 1 to 5 water molecules of hydration per formula unit.

The glass phosphors of the present invention can be obtained from a saturated solution and processed in either a microwave oven or by conventional convection drying. The addition of polymers, such as polyacrylic acid or polycaprolactone, which have melting temperatures below the melting point of the glass phosphor produce phosphorescent films which are less soluble in water and less hygroscopic.

The scope of this invention also includes the use of mixtures of the amino acids and dicarboxylic acids, as well as, polymers with properties similar to the monomer components. For example, polylysine can be substituted for lysine and polyacrylic acid can be substituted for succinic acid.

The organic phosphors of the present invention possess several distinct advantages over currently available phosphors. They include the following:

(a) Few of the currently available phosphors are considered non-toxic. As a result, no phosphors are presently used in foods. Organic phosphors can be made in which all the components are food grade chemicals. A food grade phosphor could be used as either a direct or indirect food additive. Food packaging with phosphors incorporated into the polymer or added directly to the food could monitor products for spoilage. Novelty foods could be produced with "glow in the dark" appeal.

(b) Inorganic phosphors require electronic grade purity of components (>99.9%) and are usually prepared under extreme temperatures (>900° C.). The organic phosphors are prepared from food grade or analytical grade purity (>98%) and can be processed in a microwave. Microwave temperatures never exceed 200° C. which is higher than the melting points of the organic phosphor salts.

(c) Due to their crystalline structure and high temperature of melting, the inorganic phosphors require special processing methods in order to produce thin films. Thin films are important in the electronics industry for semiconductor and television screen technologies. The organic phosphors which are amino acid salts are water soluble and thin films can be produced in a microwave oven. Since a gel/glass structure is formed other shapes can be produced such as semitransparent solid blocks or long glass-like threads. Although the material is hygroscopic and loses its phosphorescence upon absorbing water, non-polar additives or encapsulation methods can also be used for protection.

(d) Most of the rare earth elements used in the manufacture of inorganic phosphors are as expensive as the precious metals gold and platinum. All components of the phosphors of the present invention are available as inexpensive food/feed grade chemicals which do not require special purity. These materials also can be derived from renewable agricultural resources and are biodegradable. The availability, safety, and biodegradability of these phosphors can have advantages in several potential applications in the food, pharmaceutical, and environmental monitoring industries.

The methods of the present invention for using the phosphors to make objects phosphorescent include methods of irradiating the phosphors to cause phosphorescence, methods for incorporating the phosphors into an object, and methods for applying a film-forming composition, such as a phosphor containing paint or ink, to the external surface of the object. A composition particularly useful for the latter method comprises an organic phosphors encapsulated in a transparent, water insoluble polymer, such as polyvinylchloride or gelatin, dissolved in a water-based paint or ink vehicle.

The foregoing and other advantages of the present invention will become apparent to those skilled in the art from the description of the preferred embodiments.

DESCRIPTION OF THE PREFERRED EMBODIMENTS

The preferred phosphors are prepared from L-lysine and salts of succinic acid in the molar ratios of 1:1 and 2:1 and 1:2. They may conveniently be prepared by dissolving L-lysine monohydrate in water and adding salts of succinic acid to the solution. The solution is dried in an oven until solids begin to form when the solution is cooled to room temperature. If desired, the solids can be ground to obtain a free-flowing powder which can be combined with other ingredients at time of use to form compositions which can be painted or coated onto objects to make those objects phosphorescent when exposed to light, such as UV light or fluorescent light.

The following examples illustrate the preparation of the phosphors of the present invention:

EXAMPLE 1

Preparation of Lithium Lysine Succinate (1:1)

10 grams of L-lysine monohydrate are dissolved in 25 ml of water, 8.1 grams of lithium succinate is added and dissolved. The solution is then dried in a 110° C. oven until solids begin to form when cooled to room temperature. After 15 to 30 minutes solids form at room temperature and are collected.

EXAMPLE 2

Preparation of Lithium Lysine Succinate (1:2)

The procedure of Example 1 is repeated using only 5 gms of L-lysine monohydrate.

EXAMPLE 3

Preparation of Sodium Dilysine Succinate Hydrochloride (2:1:1:1)

12 grams of L-lysine monohydrate is dissolved in 20 ml of water to which 6.0 ml of concentrated hydrochloric acid has been added. 2.964 grams of disodium succinate is added to neutralize some of the excess hydrochloric acid and 2.16 grams of succinic acid are added with mixing until effervescence ceases and all solids are dissolved. The solution is dried in a 110° C. oven until solids begin to form when cooled to room temperature. After 15 to 30 minutes solids form and are collected.

EXAMPLE 4

Preparation of Magnesium-Containing Phosphor

Dissolve 10.0 grams of lysine monohydrate in 10 ml of hot water (60° C.). Add 11.1 grams of lysine monohydrochloride and 17.1 grams of magnesium succinate and bring to a boil for 5 minutes. Approximately 10 grams of the solution is dried in a microwave oven for 2 minutes (100% power) and then cooled in a freezer for 5 minutes. The dry solid gives a bright blue-green phosphorescence when excited under long wave UV light with a lifetime of 15–20 seconds.

EXAMPLE 5

Preparation of Zinc-Containing Phosphor

Dissolve 10.0 grams of lysine monohydrate in 10 ml of hot water (60° C.). Add 11.1 grams of lysine monohydrochloride, 14.4 grams of succinic acid, and 9.9 grams of zinc oxide and bring to a boil for 5 minutes. Approximately 10 grams of the solution is dried in a microwave oven for 2 minutes (100% power) and then cooled in a freezer for 5 minutes. The dry solid gives a bright green phosphorescence when excited under long wave UV light with a lifetime of 15–20 seconds.

EXAMPLE 6

Preparation of Zinc-Containing Phosphor Film

Dissolve 10 grams of lysine monohydrate in 10 ml of hot water. Add 7.18 grams of succinic acid, and 4.95 grams of zinc oxide and bring to a boil for 5 minutes. This material when cooled gives a clear highly viscous gel which can be coated on surfaces. Approximately 1.0 gram of gel coating is dried in a microwave oven for 1 minute (100% power) and cooled in a freezer for 5 minutes. The dried film gives a bright green phosphorescence when excited under longwave UV light with a lifetime of 5–10 seconds.

EXAMPLE 7

Preparation of Zinc and Sulfur-Containing Phosphor

Dissolve 20.0 grams (0.122 moles) of lysine monohydrate in 10 ml of hot water (60° C.). Add 14.4 grams (0.122 moles) of succinic acid, 9.9 grams (0.122 moles) of zinc oxide, and 7.92 grams (0.045 moles) of 1-cysteine hydrochloride hydrate and bring to a boil for 5 minutes. This material when cooled gives a clear highly viscous gel which can be coated on surfaces. Approximately 10 grams of the gel coating is dried in a microwave oven for 2 minutes (100% power) and then cooled in a freezer for 5 minutes. The dry solid gives a bright green-yellow phosphorescence when excited under long-wave UV light with a lifetime of 5–10 seconds.

EXAMPLE 8

Preparation of Lysine Succinate and PABA Glass

The phosphor glass is prepared from 10 grams of lysine monohydrate dissolved in 6 gm water, 2.45 gm MgO, and 7.45 gm of succinic acid. The aromatic fluorescent material, para aminobenzoic acid (PABA) is added at 0.01%–0.16% by weight of the total dry ingredients. The clear gel is dried in a microwave for 60 seconds and cooled to form a glass. The phosphorescence of the material is observed to have different colors under short and long wavelength UV light. At 365 nm the phosphorescence is blue/green lasting up to 25 seconds and is similar to that observed without the PABA. Under shortwave UV (254 nm) the phosphorescence is intensely blue/white lasting up to 20 seconds. Without PABA the shortwave phosphorescence is substantially reduced in intensity and is less blue and more green in color. The fluorescence of the solid is substantially brighter at both wavelengths of excitation.

EXAMPLE 9

Preparation of Glasses Containing Benzoic Acid Derivatives

Phosphors are prepared containing one of the following benzoic acid derivatives: salicylic acid (orthohydroxybenzoic acid, benzoic acid, and vanillin (3-methoxysalicylaldehyde) in a manner similar to Example 8 but with the indicated chromophores in place of PABA. The following table shows the phosphorescence observed:

| Chromophore Compound | Color/Intensity (254 nm) | Color/Intensity (365 nm) |
| --- | --- | --- |
| Salicylate | blue++ | blue++ |
| Benzoic | green– | blue/green– |
| vanillin | blue/white++ | blue/green– |
| PABA | blue/white++ | blue/green– |

–indicates no change from control ++indicates intense color observed)

EXAMPLE 10

Glass Containing Vanillic Acid

Clear gel and glassy materials are prepared from other amino acids having a linear carbon chain separating the amino and carboxyl group. The following amino acids and (weights) can be used to substitute for lysine monohydrate in Example 8 above: glycine (4.6 gm), β-alanine (5.4 gm), 4-aminobutyric acid [GABA], (6.3 gm), 6 aminocaproic acid (7.9 gm). Although intrinsic phosphorescence is not observed with these glasses, addition of 0.0086 gm vanillic acid (0.06%) produces a green/blue phosphorescence.

EXAMPLE 11

Glass Containing Fluorescein

The procedure of Example 8, is repeated using 0.009 gm of fluorescein (sodium salt) in place of the PABA. The solid fluorescein salt does not fluoresce unless dissolved in a solvent. The dried glass shows a brilliant yellow/white fluorescence. The solid produces a yellow phosphorescence when excited with LWUV which changes to green phosphorescence after 15 seconds. The solid was placed in pure ethanol and it was observed that no fluorescein was dissolved from the glass over several months.

EXAMPLE 12

Glass Containing Vitamin A

The procedure of Example 8 is repeated using 10 gm lysine and 10 ml water to dissolve 4 gm ZnO, 8.3 gm malic acid, and 0.01 gm of vitamine A acetate. The yellow gel was microwaved to give a solid glass giving blue fluorescence (long wave) and green phosphorescence.

EXAMPLE 13

Glass Containing Vitamin E

The procedure of Example 12 is repeated using 0.036 gm of vitamin E instead of the vitamin A acetate. The resulting glass gave a blue fluorescence, and blue green phosphorescence.

EXAMPLE 14

Glass Containing Folic Acid

The procedure of Example 8 was repeated using 0.02 gm folic acid added in place of PABA. The resulting glass gave a blue fluorescence, and blue phosphorescence.

EXAMPLE 15

Fluorescent Hydroxyquinoline-5-sulfonic Acid Gels and Solids

Intense yellow/green fluorescence is observed from gels and solids made combining 10 gm lysine monohydrate dissolved in 28 gm water, 4.96 gm ZnO, 12.6 citric acid and 0.1 gm 8 hydroxyquinoline-5-sulfonic acid monohydrate. No phosphorescence is observed.

EXAMPLE 16

Aromatic Dicarboxylic Acid Containing Glasses

Aromatic dicarboxylic acids can substitute for linear dicarboxylic acids. Orthophthalic acid (10.13 gm) or terephthalic acid (10.13 gm) can combine with 10 gm lysine and 2 grams MgO in 10 gm water. When dried the glass solids fluoresce blue and have a weak green phosphorescence under UV light.

EXAMPLE 17

Glycine Containing Glasses

Differences in phosphorescence are observed by substituting glycine for lysine. With vitamin A acetate blue phosphorescence is observed if lysine is used but no phosphorescence is observed with glycine. Either 10 gm lysine or 4.7 gm glycine and 10 ml or water dissolve 2.45 gm MgO. 7.4 gm succinic acid and 0.02 gm vitamin A acetate which is dried in a microwave.

EXAMPLE 18

Glasses Containing PH Sensitive Dyes

Dyes which are sensitive to pH can be incorporated in the glass. The pH of the glass can be adjusted to between pH 2 to pH 11. The pH is selected to be below the transition range of the indicator. To 0.01 gms of bromophenol blue (transition pH 6.0 (yellow) to pH 7.6 (blue)) or bromocresol purple (transition pH 5.2 (yellow) to 6.8 (purple)) are dissolved in the lysine or glycine glass as in Example 16. A red fluorescence is observed from the dry solid. No fluorescence is observed from the dry indicator dye. The red fluorescence corresponds to the emission observed with these dyes dissolved in ethanol. Excitation at 380 nm shows fluorescence at 585 nm for these dyes. Compositions containing rhodamine dyes also can be made.

In Examples 19 to 22 the glass was prepared from the gel. The viscous gel was dried under microwave radiation or by conventional oven drying methods. The advantage of microwave drying is the rapid release of water and the development of the glass structure in the microwave. Phosphorescence can also be obtained by freezing a gel containing up to 30% water by weight to 70% by weight. Phosphorescence also can be obtained by removing water with a dehydrating agent, such as ethanol.

EXAMPLE 19

Preparation of Lysine Magnesium Succinate Glass

Dissolve 10.0 grams of lysine monohydrate in 10 ml of hot water (60° C.). Add 11.1 grams of lysine monohydrochloride and 17.1 grams of magnesium succinate and bring to a boil for 5 minutes. This viscous gel is then frozen in a freezer at −20° C. for 5 minutes. The frozen solid gives a bright blue green phosphorescence when excited under a long wave UV light with a lifetime of 15–20 seconds similar to the dried solid.

EXAMPLE 20

Preparation of Lysine Magnesium Citrate Glass

Dissolve 12.0 grams of lysine monohydrate in 10 ml of hot water (60° C.). Add 1.8 grams of magnesium oxide and 12.1 grams of citric acid monohydrate and bring to a boil for 5 minutes. The resulting syrup is cooled to room temperature. Approximately 2 grams of the syrup is added to 10 grams of anhydrous ethanol. The dehydrated solid gives a bright blue green phosphorescence when excited under a long wave UV light with a lifetime of 15–20 seconds similar to the dried material.

Room temperature phosphorescence in amorphous glass matrices is reduced by the presence of water in hydroscopic materials but is unaffected by oxygen. Through a reversible removal of water from the materials is described in Example 21, the quenching process is inhibited and full luminescence of the material is recovered.

EXAMPLE 21

Preparation of Redried Glass

The solid prepared in Example 4 above (10 grams) is dissolved in 10 grams of hot water. The material is dried again in a microwave and cooled in a freezer. The resulting solid gives bright blue green phosphorescence similar to that described in Example 19.

EXAMPLE 22

Preparation of Lysine Magnesium Fumarate Glass

Dissolve 10.0 grams of lysine monohydrate in 10 ml of hot water (60° C.). Add 11.1 grams of lysine monohydrochloride and 16.8 grams of magnesium fumarate and bring to a boil for 5 minutes. Approximately 10 grams of the viscous solution is dried in a microwave oven for 2 minutes (100% power) and then cooled in a freezer for 5 minutes. The dried solid has a similar appearance to the glass made with magnesium succinate but it does not give phosphorescence when excited under a long wave UV.

It appears that the phosphorescent glasses of the present invention can be prepared with succinic acid, as well as, malic acid, citric acid, and isocitric acid but not with fumaric acid, oxaloacetic acid, aconitic acid or ketoglutaric acid. The ability of the alternating substrates of the Kreb's (tricarboxylic acid cycle) cycle to luminesce under SWUV and LWUV radiation is related to the electron affinity of these substrates. The low electron affinity of organic acids is related to their ability to form a phosphorescent glass. The high affinity of the alternate organic acids in the cycle diminish the ability of the glass to phosphoresce. These luminescent and non-luminescent materials have application in the identification of Kreb cycle intermediates which occurs in many biological and microbiological environments. This invention allows for the identification of Kreb cycle intermediates by incorporation of these intermediates in the gel and drying and observing the presence or absence of phosphorescence.

The above examples are illustrative and salts containing the same ingredients in the other molar ratios can be prepared by the or other known same procedures.

Representative of additional phosphors of the present invention are the following:

((L-lysine)(succinic acid)$Mg(OH)_2$);
((L-lysine)(succinic acid)$Zn(OH)_2$);
((L-lysine)(succinic acid)$Ca(OH)_2$);
((L-lysine)(adipic acid)$CaCl(OH)$);
((L-lysine)(L-malic acid)$Mg(OH_2)$));
((L-lysine)(suberic acid)$ZnCl(OH)$);
((L-lysine)(L-aspartic acid)$Mg(OH_2)$);
((L-ornithine)(succinic acid)$Mg(OH_2)$);
((L-ornithine)(succinic acid)$Zn(OH_2)$);
((L-ornithine)(succinic acid)$Ca(OH_2)$);
((L-ornithine)(adipic acid)$CaCl(OH)$);
((L-ornithine)(L-malic acid)$Mg(OH_2)$);
((L-ornithine)(suberic acid)$ZnCl(OH)$); and
((L-ornithine)(L-aspartic acid)$Mg(OH)_2$.

Representative of additional glass formers of the present invention are the following:

((L-glycine)(succinic acid)Mg(OH)$_2$
((L-glycine)(succinic acid)Zn(OH)$_2$
((L-glycine)(succinic acid)Ca(OH)$_2$
((L-glycine)(adipic acid)CaCl(OH)
((L-glycine)(L-malic acid)Mg(OH)$_2$
((L-glycine)(suberic acid)ZnCl(OH)
((L-glycine)(L-aspartic acid)Mg(OH)$_2$ All of the ingredients used in preparing the phosphors of the present invention are readily available.

Presently all the amino acids are commercially available. The lysine monohydrate and the lysine hydrochloride are available from various sources (such as Ajinomoto, Degussa, ADM and Bio Kyowa, Inc.)

The dicarboxylic acids, including succinic acid, also are available from numerous sources. The preferred acid, succinic acid, can be synthesized from maleic anhydride or prepared by fermentation. It is approved as a food additive in relishes and condiments. It has a limited application as a food acidulant but is not as widely used as citric, lactic, malic, and fumaric acids. Succinic acid also has been used as an additive in various fermented foods such as soy, soy paste and sake.

It will be readily apparent to those skilled in the art that a number of modifications and changes can be made without departing from the spirit and scope of the invention. Therefore, it is intended that the invention only be limited by the claims.

We claim:

1. A composition for imparting photoluminescence to an object when excited ultraviolet radiation in the range of 230 to 405 nm, said composition containing a compound selected from the group consisting of:

((L-glycine)(succinic acid)Mg(OH)$_2$
((L-glycine)(succinic acid)Zn(OH)$_2$
((L-glycine)(succinic acid)Ca(OH)$_2$
((L-glycine)(adipic acid)CaCl(OH)
((L-glycine)(L-malic acid)Mg(OH)$_2$
((L-glycine)(suberic acid)ZnCl(OH)
((L-glycine)(L-aspartic acid)Mg(OH)$_2$
((L-lysine)(succinic acid)Mg(OH)$_2$);
((L-lysine)(succinic acid)Zn(OH)$_2$);
((L-lysine)(succinic acid)Ca(OH)$_2$);
((L-lysine)(adipic acid)CaCl(OH);
((L-lysine)(L-malic acid)Mg(OH$_2$));
((L-lysine)(suberic acid)ZnCl(OH);
((L-lysine)(L-aspartic acid)Mg(OH$_2$);
((L-ornithine)(succinic acid)Mg(OH$_2$);
((L-ornithine)(succinic acid)Zn(OH$_2$);
((L-ornithine)(succinic acid)Ca(OH$_2$);
((L-ornithine)(adipic acid)CaCl(OH);
((L-ornithine)(L-malic acid)Mg(OH$_2$);
((L-ornithine)(suberic acid)ZnCl(OH); and
((L-ornithine)(L-aspartic acid)Mg(OH)$_2$.

2. A composition for forming a photoluminescent film on an object, said composition comprising a film forming medium and a compound which is photoluminescent when excited by ultraviolet radiation in the range of 230 to 405 nm, selected from the group consisting of:

((L-glycine)(succinic acid)Mg(OH)$_2$
((L-glycine)(succinic acid)Zn(OH)$_2$
((L-glycine)(succinic acid)Ca(OH)$_2$
((L-glycine)(adipic acid)CaCl(OH)
((L-glycine)(L-malic acid)Mg(OH)$_2$
((L-glycine)(suberic acid)ZnCl(OH)
((L-glycine)(L-aspartic acid)Mg(OH)$_2$
((L-lysine)(succinic acid)Mg(OH)$_2$);
((L-lysine)(succinic acid)Zn(OH)$_2$);
((L-lysine)(succinic acid)Ca(OH)$_2$);
((L-lysine)(adipic acid)CaCl(OH);
((L-lysine)(L-malic acid)Mg(OH$_2$));
((L-lysine)(suberic acid)ZnCl(OH);
((L-lysine)(L-aspartic acid)Mg(OH$_2$);
((L-ornithine)(succinic acid)Mg(OH$_2$);
((L-ornithine)(succinic acid)Zn(OH$_2$);
((L-ornithine)(succinic acid)Ca(OH$_2$);
((L-ornithine)(adipic acid)CaCl(OH);
((L-ornithine)(L-malic acid)Mg(OH$_2$);
((L-ornithine)(suberic acid)ZnCl(OH); and
((L-ornithine)(L-aspartic acid)Mg(OH)$_2$.

3. A photoluminescent compound comprising the reaction product of an amino acid selected from the class consisting of lysine and ornithine; a member selected from the class consisting of succinic acid, orthophthalic acid, paraphthalic acid, citric acid, adipic acid, malic acid, suberic acid, and aspartic acid and a member selected from the class consisting of zinc hydroxide, zinc chlorohydroxide, calcium hydroxide, calcium chlorohydroxide and magnesium hydroxide.

4. A compound of claim 3 in which the amino acid is lysine.

5. A compound of claim 3 in which the amino acid is ornithine.

6. A compound of claim 3 which is the form of a glassy material.

7. A photoluminescent composition comprising (a) the reaction product of an amino acid selected from the class consisting of lysine, and ornithine; a member selected from the class consisting of succinic acid, orthophthalic acid, paraphthalic acid, citric acid, adipic acid, malic acid, suberic acid, and aspartic acid; and a member selected from zinc and magnesium; and (b) a member selected from the class consisting of cysteine, salicylic acid, p-amino benzoic acid, benzoic acid, vanillin, vanillic acid, folic acid, vitamin A, vitamin E, fluorescein, rhodamine dyes, hydroxyquinoline-5-sulfonic acid, and bromocresol blue indicators.

8. A photoluminescent compound formed by reacting an amino acid selected from the class consisting of lysine and ornithine with magnesium succinate.

* * * * *